(12) United States Patent
Schumacher et al.

(10) Patent No.: US 12,478,907 B2
(45) Date of Patent: Nov. 25, 2025

(54) FILTER MODULE FOR THE SEPARATION OF OVERSPRAY

(71) Applicant: Carl Freudenberg KG, Weinheim (DE)

(72) Inventors: Sascha Schumacher, Wald-Michelbach (DE); Silvan Schneider, Ladenburg (DE); Juergen Becker, Zeiskam (DE); Christian Ewald, Rimbach (DE); Christian Westenburger, Mehlbach (DE)

(73) Assignee: CARL FREUDENBERG KG, Weinheim (DE)

( * ) Notice: Subject to any disclaimer, the term of this patent is extended or adjusted under 35 U.S.C. 154(b) by 690 days.

(21) Appl. No.: 17/893,199

(22) Filed: Aug. 23, 2022

(65) Prior Publication Data

US 2023/0064304 A1  Mar. 2, 2023

(30) Foreign Application Priority Data

Aug. 24, 2021 (EP) ..................................... 21192828

(51) Int. Cl.
 *B01D 46/00* (2022.01)
 *B01D 39/16* (2006.01)
 (Continued)

(52) U.S. Cl.
 CPC ......... *B01D 46/0009* (2013.01); *B01D 39/16* (2013.01); *B01D 46/0031* (2013.01); *B01D 46/4209* (2013.01); *B01D 46/58* (2022.01); *B01D 46/62* (2022.01); *B01D 2239/0618* (2013.01); *B01D 2267/40* (2013.01)

(58) Field of Classification Search
 None
 See application file for complete search history.

(56) References Cited

U.S. PATENT DOCUMENTS 4,437,867 A * 3/1984 Lerner .................. B01D 46/12
                                                         55/423
4,484,513 A * 11/1984 Napadow .............. B05B 14/465
                                                         454/55

(Continued)

FOREIGN PATENT DOCUMENTS

| DE | 202014103177 U1 | 8/2014 |
|---|---|---|
| DE | 102013004082 A1 | 9/2014 |

(Continued)

*Primary Examiner* — Brit E. Anbacht
(74) *Attorney, Agent, or Firm* — LEYDIG, VOIT & MAYER, LTD.

(57) ABSTRACT

A filter module, including a plurality of filter elements for separating overspray from an air flow, the filter module including a reusable and cleanable frame configured as a support structure for components for collecting overspray, and a plurality of components inserted into the frame for collecting overspray, wherein the components for collecting overspray are at least filter elements and linings in the frame, which are configured as disposable, single-use products the filter elements form at least a first filter stage, and all the surfaces of the frame which are exposed to the air flow upstream of the first filter stage are provided with the linings such that the surfaces of the frame are protected against overspray.

16 Claims, 4 Drawing Sheets

(51) Int. Cl.
  *B01D 46/42* (2006.01)
  *B01D 46/58* (2022.01)
  *B01D 46/62* (2022.01)

(56) References Cited

U.S. PATENT DOCUMENTS

| | | | | |
|---|---|---|---|---|
| 4,590,884 A * | 5/1986 | Kreeger | ................. | B05B 14/43 |
| | | | | 118/631 |
| 5,153,034 A * | 10/1992 | Telchuk | ................. | B05B 16/60 |
| | | | | 427/427.2 |
| 5,527,564 A * | 6/1996 | Napadow | ................. | B05B 5/087 |
| | | | | 427/483 |
| 6,010,554 A * | 1/2000 | Birmingham | ......... | B01D 45/08 |
| | | | | 95/32 |
| 9,833,805 B2 * | 12/2017 | Schmeinck | ............ | B01D 45/12 |
| 9,950,335 B2 * | 4/2018 | Roeckle | ............ | B01D 46/0002 |
| 10,596,504 B2 * | 3/2020 | Wieland | ................. | B01D 46/62 |
| 10,610,876 B2 * | 4/2020 | Froehlich | ............ | B05B 14/437 |
| 10,646,891 B2 * | 5/2020 | Zebisch | ................. | B05B 16/40 |
| 10,780,382 B2 * | 9/2020 | Katefidis | ................. | B01D 46/12 |
| 11,235,346 B1 * | 2/2022 | Ishida | ................. | B01D 46/4227 |
| 11,491,503 B2 * | 11/2022 | Saito | ................. | B05B 14/43 |
| 2002/0096111 A1 * | 7/2002 | Shutic | ................. | B05B 7/1454 |
| | | | | 118/308 |
| 2004/0107834 A1 * | 6/2004 | Feisthammel | ....... | B01D 53/261 |
| | | | | 95/117 |
| 2005/0229560 A1 * | 10/2005 | Eder | ................. | B01D 46/0016 |
| | | | | 55/467 |
| 2006/0252881 A1 * | 11/2006 | DeSaw | ................. | C09D 5/032 |
| | | | | 524/847 |
| 2008/0314248 A1 * | 12/2008 | Peteln | ................. | B01D 45/12 |
| | | | | 55/482 |
| 2009/0025864 A1 * | 1/2009 | Fox | ................. | B32B 15/082 |
| | | | | 156/196 |
| 2009/0209188 A1 * | 8/2009 | Wieland | ................. | B05B 14/469 |
| | | | | 454/53 |
| 2010/0159815 A1 * | 6/2010 | Reid | ................. | B01D 46/64 |
| | | | | 454/53 |
| 2014/0202332 A1 * | 7/2014 | Link | ................. | B05B 14/43 |
| | | | | 55/436 |
| 2014/0366798 A1 * | 12/2014 | Katefidis | ................. | B01D 39/14 |
| | | | | 55/482 |
| 2015/0367372 A1 * | 12/2015 | Roeckle | ................. | B01D 46/0002 |
| | | | | 55/495 |
| 2015/0375251 A1 * | 12/2015 | Roeckle | ................. | B05B 14/43 |
| | | | | 95/286 |
| 2016/0023231 A1 | 1/2016 | Schmeinck | ............. | B05B 14/43 |
| | | | | 55/318 |
| 2016/0288036 A1 * | 10/2016 | Wieland | ................. | B01D 46/0002 |
| 2018/0243778 A1 * | 8/2018 | Covizzi | ................. | B01D 46/0006 |
| 2019/0076869 A1 * | 3/2019 | Fröhlich | ................. | C09D 7/71 |
| 2019/0247878 A1 * | 8/2019 | Röckle | ................. | B01D 46/62 |
| 2020/0047097 A1 * | 2/2020 | Knaus | ................. | B01D 45/08 |
| 2020/0276605 A1 * | 9/2020 | Bubek | ................. | B05B 14/43 |

FOREIGN PATENT DOCUMENTS

| | | |
|---|---|---|
| DE | 102018118796 A1 | 2/2020 |
| EP | 3524361 A1 | 8/2019 |
| JP | 6895011 B1 | 6/2021 |

\* cited by examiner

FILTER MODULE FOR THE SEPARATION OF OVERSPRAY

CROSS-REFERENCE TO PRIOR APPLICATIONS

This application claims benefit to European Patent Application No. EP 21 192 828.8, filed on Aug. 24, 2021, which is hereby incorporated by reference herein.

FIELD

The invention relates to a filter module comprising a plurality of filter elements for separating overspray from the air.

BACKGROUND

When coating and painting objects such as vehicle bodies or vehicle components in a paint booth, the coating material is atomized and transferred to the object by means of an air flow. However, only a part of the coating material stream intended for the object to be coated actually reaches the object. Another part remains in the air flow in the form of overspray and has then to be separated from the air flow again. In a broad sense, the terms overspray, overspray particles and overspray solids are understood here, and in the following, to refer to a dispersive system such as an emulsion, a suspension or a combination thereof. The overspray is collected by the air flow and fed to a separation process whereby, after suitable conditioning, the air can be returned to the paint booth if required. A coating system of this type is described, for example, in DE 10 2013 004 082 A1.

Replaceable disposable filter modules are described as a possibility of separation in the above-mentioned publication. During operation, the paint booth air loaded with overspray flows through the disposable filter modules with the result that they are gradually loaded with overspray. After reaching a maximum permissible load limit, the loaded filter modules are exchanged for unloaded filter modules.

The disposal of such filter modules generates large quantities of waste, which must be temporarily stored in the coating plants. As the filter module is generally about 2 m$^3$ in size, disposal is both cumbersome and expensive. Another disadvantage is the high consumption of resources for the production of new filter modules.

SUMMARY

In an embodiment, the present invention provides a filter module, comprising a plurality of filter elements for separating overspray from an air flow, the filter module comprising a reusable and cleanable frame configured as a support structure for components for collecting overspray, and a plurality of components inserted into the frame for collecting overspray, wherein the components for collecting overspray are at least filter elements and linings in the frame, which are configured as disposable, single-use products the filter elements form at least a first filter stage, and all the surfaces of the frame which are exposed to the air flow upstream of the first filter stage are provided with the linings such that the surfaces of the frame are protected against overspray.

DETAILED DESCRIPTION

Figure 1:
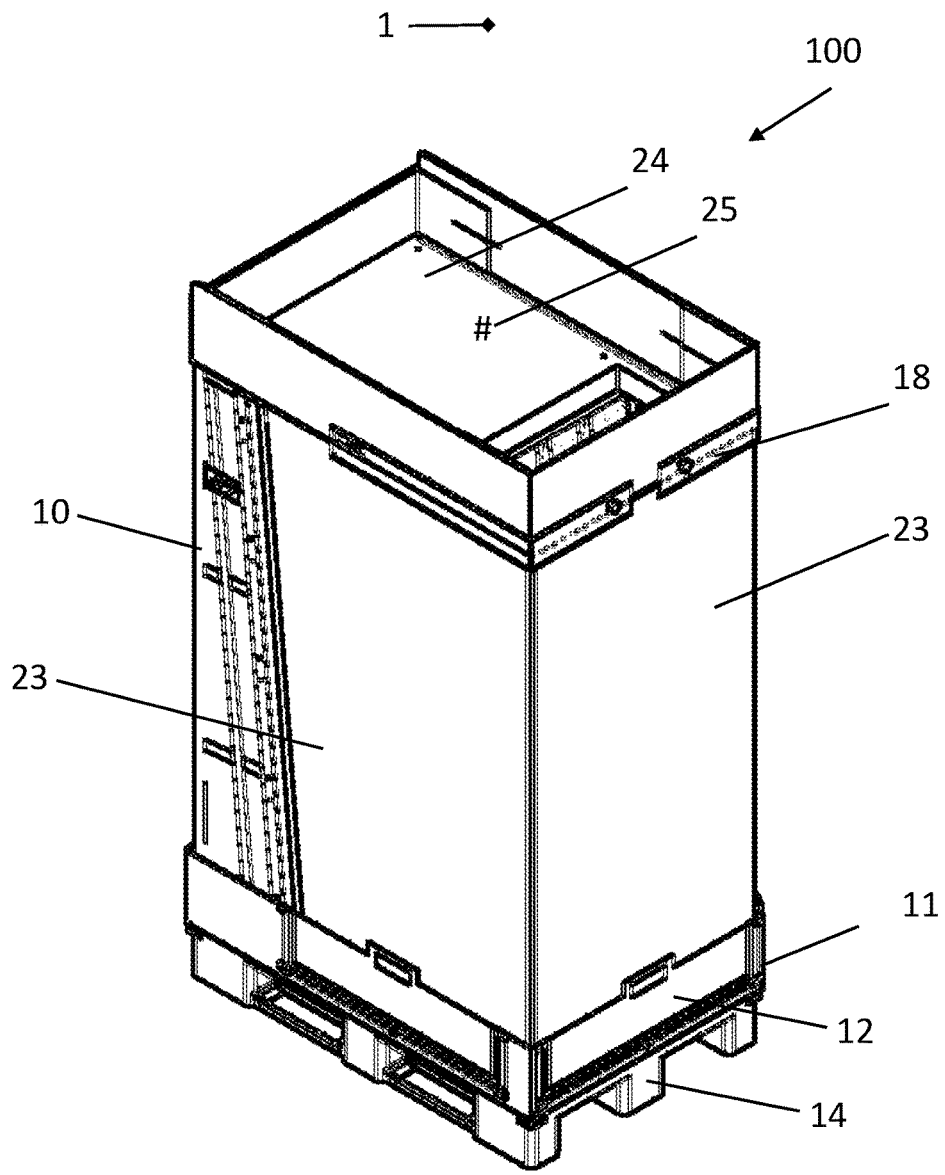
FIG. 1 shows an isometric view of a filter module according to the invention.

In an embodiment of the present invention a filter module is created for the collection of overspray which, while providing good filtration performance, also ensures good and resource-efficient handling with respect to disposal, and which at least partially remedies the disadvantages of the prior art.

In an embodiment according to the invention, it has been deemed advantageous to combine a frame of a reusable and cleanable design with components for the collection of overspray of a disposable design.

The filter module according to the invention has a plurality of filter elements for separating overspray from the air and is suitable for use in a coating plant, e.g., a paint booth or painting line. The filter module has a reusable and cleanable frame which serves as a support structure to hold components for the collection of the overspray. In particular, the frame can be made of metal, e.g., aluminum, or a plastic material. Moreover, the filter module comprises a plurality of components for collecting the overspray, which are integrated into the frame in a slide-in, slide-out or insertable and removable manner, and which are designed as disposable, single-use products. This design is advantageous in that when the maximum permissible loading of the filter module with overspray is reached, only the components wetted with overspray are disposed of and replaced by new ones. The frame itself can be reused. Preferably, the components for collecting the overspray are manufactured primarily from recycled or renewable raw materials. It is further preferred if the components for collecting overspray are suitable for thermal recycling. The frame can be cleaned and reused several times. In this way, the volume of waste can be reduced and the consumption of resources minimized.

In an embodiment according to the invention, the components for collecting the overspray are at least filter elements and frame linings. The filter elements can be specially optimized for the collection of overspray. The frame can include a plurality of shelf-like receiving trays for insertion of the filter elements. The filter elements form at least a first filter stage.

All the surfaces or areas of the frame upstream of the first filter stage that are exposed to the air flow are provided with linings to protect them against overspray. In other words, the linings advantageously prevent the air flow loaded with overspray from contacting these surfaces and potentially contaminating them. The linings are contaminated instead. This minimizes the time and effort required to clean the frame prior to reuse. The surfaces of the frame with the linings that are impacted by the air flow may be, in particular, an upper inflow area of the frame and an area at the base of the frame.

After the first filter stage, the air flow has already undergone initial cleaning by the filter elements, so there is no need for the surfaces of the frame located downstream of the first filter stage to also be provided with such linings.

The surfaces of the frame provided with linings are understood here to be surfaces with a planar extension. Narrow surfaces with relatively small widths and a length/width ratio greater than 20:1, such as the front edges of shelves, are not considered surfaces of this type here. These narrow surfaces can, for example, be covered with adhesive tape to protect them against overspray.

It is particularly advantageous if the linings are made of cardboard, e.g., corrugated board, cardboard or paper. The linings can be specially cut to size and, if necessary, also folded. In the case where the linings are folded, they have a three-dimensional configuration. In an advantageous embodiment, the linings can be formed from plastic sheets or foils. For the plastic sheets and foils made of plastic, recycled plastic can be used in particular. The foils can also be so-called spray foils, which can be sprayed on particularly easily by means of the spray-foiling technique, which is also referred to as peelable lacquer. Such spray films are particularly easy to remove from the surfaces again.

In a particularly advantageous embodiment, the linings are provided with small flow obstacles on the surface of the side facing the air flow, to optimize the separation of overspray. In contrast to linings with a planar design, overspray can thus be separated more effectively. If the linings are made of cardboard, paper or plastic sheets, they can be slotted, i.e., be provided with a plurality of slots, whereby each slot forms a flow obstacle.

It is particularly advantageous if the filter elements of the filter module are made of paperboard, cardboard or paper, e.g., corrugated paperboard, corrugated cardboard, slotted and/or wound-up cardboard or cardboard with a honeycomb structure. In an embodiment, such a filter element comprises several layers of slotted cardboard through which the air to be cleaned flows. The layers are accommodated in and connected to an outer box made of cardboard.

The filter elements of the filter module may additionally or alternatively have filter mats made of a synthetic nonwoven material. The filter mat can be incorporated in a frame. It is particularly advantageous if the filter mat is folded several times, in particular if it is pleated, to achieve a greater effective filtration surface area.

In an advantageous embodiment of the filter module according to the invention, a plurality of filter elements of a first type are arranged parallel to one another forming a first filter stage, and a plurality of filter elements of a second type are arranged parallel to one another forming a second filter stage. In this case, the first and second filter stages are directly adjacent to one another, i.e., the filter elements of the first and second types are arranged in series with respect to one another with no space in between. In other words, the filter elements of the first type and the filter elements of the second type are in contact with one another, hereby preventing contamination of the frame when the air flows from the respective first type of filter element to the downstream second type of filter element. The filter elements may also have a zone without a filter medium, which provides a space for flow homogenization of the through-flowing air.

In an embodiment of the filter module, the frame has support surfaces for the filter elements, e.g., the aforementioned shelves, whereby said support surfaces have a low surface energy, namely less than 50 mJ/m$^2$. As a result, the support surfaces have poor wettability and adhesion and the overspray can adhere only poorly or, in best case, not at all to them.

In an embodiment of the filter module, components used to collect the overspray comprise a wall on the frame. The wall forms the separating layer between the interior and exterior of the filter module. To insert and guide the walls, grooves can be provided as part of the frame. The components can be made in particular of cardboard, paperboard or paper, e.g. of pre-folded and/or punched cardboard sheets. Such cardboard sheets can be easily inserted or attached to the frame.

The frame of the filter module can have an air inlet and an air outlet, wherein by means of the frame and the components for collecting the overspray an air conduit is formed from the air inlet to the air outlet, by means of which the air to be cleaned is guided through the filter elements.

In an embodiment of the filter module according to the invention, the air conduit has an air channel which—viewed in the direction of flow—is positioned between the air inlet and the filter elements, in particular between the air inlet and the filter elements of a first filter stage. The air conduit has a funnel shape such that the air conduit tapers, i.e. its horizontal cross-sectional area from an air inlet located in the upper region of the filter module can decrease towards the base of the frame. This allows a low-loss inflow of air up to the filter elements, which manifests itself in the form of lower pressure losses, so that only a low fan power is required to move the air flow through the filter module. In addition, the funnel shape leads to a more uniform loading of filter elements arranged in parallel in the first filter stage, since successive portions of the air flow with overspray are discharged into the filter elements of the first filter stage. In a possible advantageous embodiment, the air conduit—in its vertical cross section in the direction of flow—can have a trapezoidal shape, e.g. that of a right-angled trapezoid with an internal angle of about 93 to 97°.

In an advantageous embodiment of the filter module, the frame is made of aluminum sections and the aluminum sections are clad with aluminum sheet. Such a frame is strong, relatively light, resistant to overspray and easy to clean.

In an advantageous embodiment, a breaking device can be provided in the filter module to break up adhesions from overspray and to facilitate replacement of the filter elements. The breaking device can be formed, for example, by fold-down shelves on which the filter elements are located. The breaking device can be formed, for example, by shelves with at least one groove-shaped recess for guiding a saw blade operated by a machine operator.

The breaking device can be formed, for example, by a receiver for filter elements of the second filter stage that is axially displaceable in the direction of flow.

In an advantageous embodiment of the filter module, a collection pan is provided on an upper side of the base of the frame for collecting liquid, e.g. liquid paint. This can additionally be provided with an opening flap for the insertion of filter elements, whereby the filters in their active position are located directly above the collection pan. In this way, the installation space available in the filter module can be utilized in the best possible way for accommodating filter elements.

In a particularly useful embodiment of the filter module, a device with two recesses is provided on the underside of the frame base for the insertion of the forks, i.e. the forks of an industrial truck, in particular a forklift truck. In this way, the filter module can be easily moved and exchanged by a machine operator. In particular, the device can be designed as a Euro-pallet which can be integrated into the frame. Such a pallet is inexpensive and widely available.

Insofar as it is technically feasible, embodiments of the invention described, which may be combined with one another, represent advantageous further embodiments of the invention.

Further advantages and, from a constructional and functional aspect, advantageous embodiments of the invention are disclosed in the description of the exemplary embodiments with reference to the accompanying drawing figures.

Embodiments of the invention will be explained in more detail with reference to the accompanying drawings. Corresponding elements and components are given the same reference numerals in the figures. For the sake of clarity, the figures have not been drawn to scale.

In the schematic representations of the figures:

FIG. 1 shows an isometric view of a filter module 100 according to the invention. The filter module 100 can be arranged below a paint booth or paint line 1 and is used to separate overspray from the air, resulting for example from the coating of sheet metal parts. The filter module 100 has a reusable and cleanable frame 10, into which various components for collecting overspray 20 can be inserted and installed. In the view of FIG. 1, cardboard sheets can be seen on the components for collecting overspray 20, which serve on the one hand as a wall 23 on the frame 10 and on the other hand as a lining 24 within the frame 10. The lining 24 covers a surface 25 of the frame 10 in front of the first filter stage formed by first filter elements 21. The wall 23 is formed by a U-shaped folded cardboard sheet and is installed in the frame 10 by means of a securing plate 18. The components for collecting overspray 20 are essentially disposable, single-use products. A Euro-pallet 14 is arranged on the underside of the base 11 of the frame 10. This serves as a device having two recesses into which the forks of a lift truck or other industrial truck can be inserted. This enables smooth transport of the filter module 100 across a workshop floor. In this way, the replacement of a used filter module 100 by a new or re-equipped filter module can be carried out in a particularly easy manner.

Figure 2:
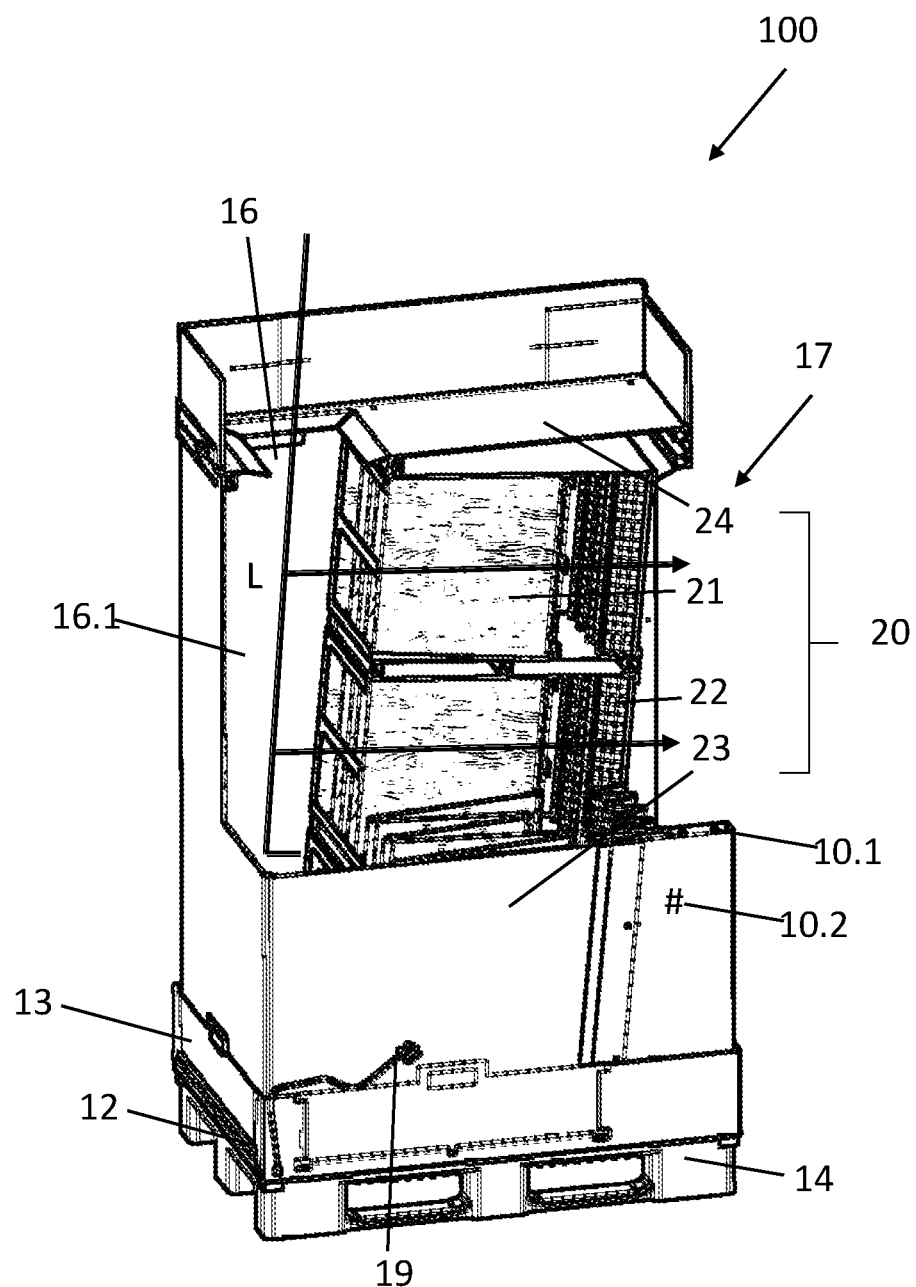
FIG. 2 shows a partial section of the filter module of FIG. 1.

FIG. 2 shows the filter module 100 of FIG. 1 in a partial section, which exposes the interior of the filter module 100. Inside the filter module 100, filter elements 21 of a first type and filter elements 22 of a second type are arranged as additional components for collecting overspray 20. The filter elements of the first type 21 are each arranged parallel to one another. The filter elements of the second type 22 are also arranged parallel to one another. The filter elements of the second type 22 are arranged in series with the filter elements of the first type 21, so that an air flow L to be cleaned flows first through the filter elements of the first type 21 and then through the filter elements of the second type 22, wherein the air flow L is cleaned. The filter elements of the first type 21 form a first filter stage and the filter elements 22 form a second filter stage, wherein the first and second filter stages are arranged seamlessly contiguous to one another without any intermediate space. In other words, there are no spaces between the filter elements of the first type 21 and the filter elements of the second type 22, in which overspray could collect and thus contaminate the frame 10.

The filter module 100 has an air inlet 16 and an air outlet 17 provided in its frame 10. An air flow L to be cleaned is directed from the air inlet 16 through the filter elements 21 and 22 to the air outlet 17, thereby being cleaned by the filter elements 21 and 22. The filter elements 21 and 22 are arranged in the filter module 100 in such a way that an air channel 16.1 is formed between the air inlet 16 and the filter elements of the first type 21. The air channel 16.1 has a funnel shape and tapers from the air inlet 16 towards the base 11 of the frame 10. This ensures a low-loss inflow of the air flow L to be cleaned into the filter module 100 up to the filter elements of the first type 21. To collect liquid and dripping particles of overspray from the air flow L, a collection pan 12 is arranged on the upper side of the base 11 of the frame 10.

To avoid electrical charging of the filter module 100, the frame 10 is provided with an earth connection 19. In this way, unwanted impairment of the filtration performance due to the effect of a charge on the air flow L to be cleaned as well as the risk of ignition can be prevented. This also enables operation in so-called ATEX zones, i.e. in potentially explosive atmospheres (ATmosphères EXplosibles).

Once the filter elements 21, 22 have reached a maximum permissible loading limit with overspray particles filtered out of the air flow L, the components 20 for collecting overspray can be removed from frame 10 and disposed of. The frame 10 can be cleaned before fresh components 20 for collecting overspray are inserted into the frame 10 again.

Figure 3:
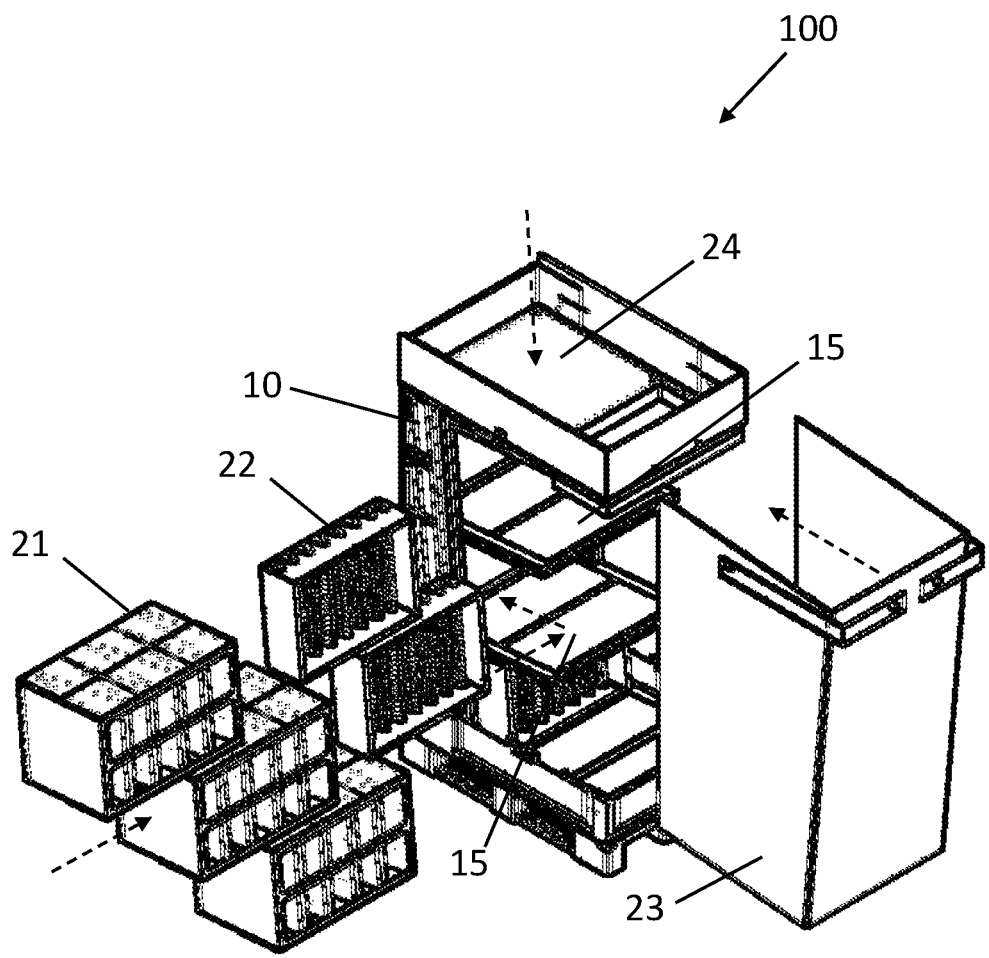
FIG. 3 shows an assembly of the filter module of FIG. 1.

The procedure for inserting and installing the components for collecting overspray 20 in the frame 10 is illustrated in FIG. 3.

FIG. 3 shows how the filter module 100 of FIG. 1 is assembled, in particular how components for collecting overspray 20 are installed. As indicated by the dashed arrows, the components for collecting overspray 20 are slid in to the frame 10 and installed on the frame 10. For instance, filter elements of the second type 22 are inserted into the holding shelves 15 of the frame 10 first. Subsequently, filter elements of the first type 21 are likewise inserted into the holding shelves 15. When all filter elements 21, 22 are in place in the frame 10, the wall 23 is installed on the frame 10 and the lining 24 is inserted. The wall 23 then forms the separating layer between the interior and exterior of the filter module 100. FIG. 3 shows an assembly state in which a filter element of the second type 22 has already been inserted into the lowermost holding shelf 15 and the lining 24 has been inserted. The other components for collecting overspray 20 have yet to be inserted into the frame 10 and installed on the frame 10.

Figure 4:
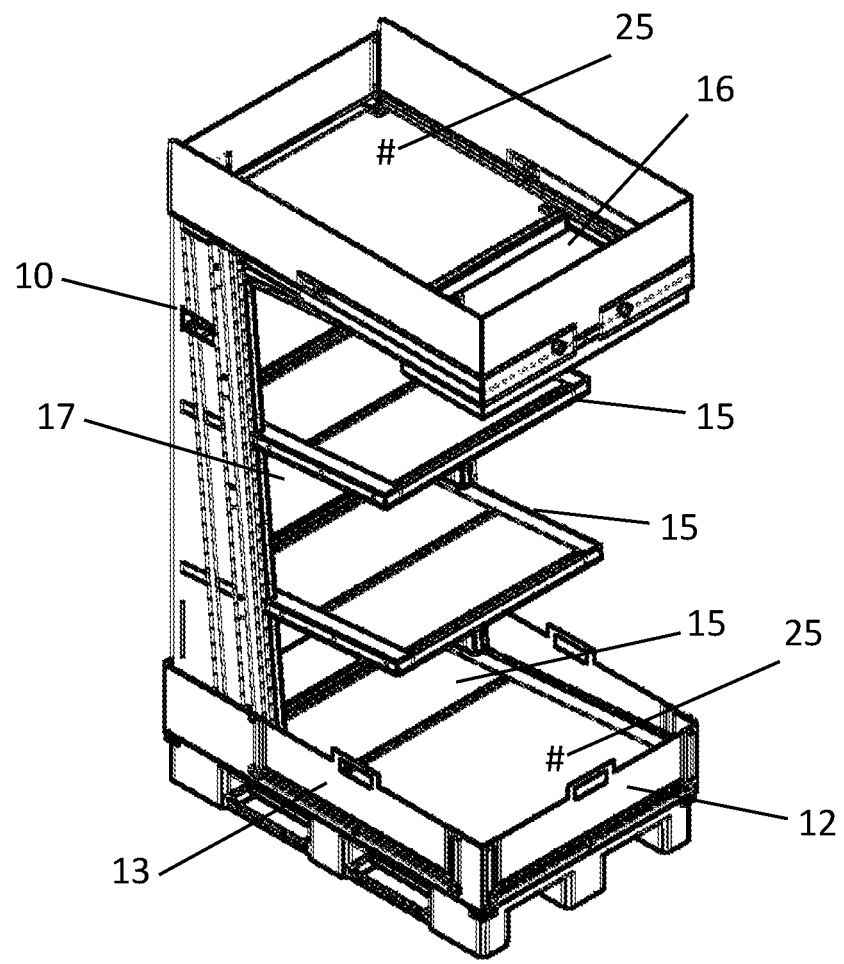
FIG. 4 shows a reusable frame of the filter module of FIG. 1

FIG. 4 shows the reusable frame of the filter module 100 of FIG. 1 without components for collecting overspray 20, so that the elements of the frame 10 can be seen more clearly. The frame 10 has three holding shelves 15, into each of which filter elements 21, 22 can be inserted and installed. In order to enable filter elements 21, 22 to be inserted even on the lowermost holding shelf 15, the collection pan 12 is provided with an opening flap 13 in one of its side walls. When the opening flap 13 is open, as is also shown in FIG. 3, the lowermost filter elements 21, 22 can be inserted without difficulty. A surface 25 at the bottom of the frame 10 can be provided with a lining 24, which is placed in the collection pan 12.

The frame 10 is formed of aluminum sections 10.1 and aluminum sheet 10.2, as can also be seen in the sectional view of FIG. 2. The aluminum sheet 10.2 clads the framework of aluminum sections 10.1 so that flat, easy-to-clean surfaces are achieved.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 position of coating plant
10 reusable and cleanable frame
10.1 aluminum section
10.2 aluminum sheet
11 base
12 collection pan
13 opening flap
14 Euro-pallet
15 holding shelf
16 air inlet
16.1 air channel
17 air outlet
18 securing plate
19 earth connection
20 component for collecting overspray
21 filter element of first type
22 filter element of second type
23 wall of frame
24 lining of frame
25 surface of frame with lining
100 filter module
L air flow

The invention claimed is:

1. A filter module, comprising a plurality of filter elements for separating overspray from an air flow, the filter module comprising:
   a reusable and cleanable frame configured as a support structure for components for collecting overspray, and
   the components inserted into the frame for collecting overspray, wherein:
      the components for collecting overspray are at least the plurality of filter elements and linings in the frame, which are configured as disposable, single-use products,
      the plurality of filter elements form at least a first filter stage, and
      all the surfaces of the frame which are exposed to the air flow upstream of the first filter stage are provided with the linings such that the surfaces of the frame are protected against overspray.

2. The filter module according to claim 1, wherein the surfaces of the frame comprising the linings which are exposed to the air flow are an upper inflow region of the frame and a region at a base of the frame.

3. The filter module according to claim 1, wherein the plurality of filter elements are formed from cardboard, paperboard or paper and/or wherein the linings are formed from cardboard, paperboard or paper, plastic sheets or foils.

4. The filter module according to claim 1, wherein the surface of the linings is provided with flow obstacles for optimized separation of overspray.

5. The filter module according to claim 1, wherein the plurality of filter elements include filter mats made of a synthetic nonwoven material.

6. The filter module according to claim 1, wherein:
   a plurality of filter elements of a first type are arranged parallel to one another and form the first filter stage,
   a plurality of filter elements of a second type are arranged parallel to one another and form a second filter stage, and
   the first and second filter stages are directly adjacent to one another.

7. The filter module according to claim 1, wherein the frame has supporting surfaces for the plurality of filter elements and the supporting surfaces have a low surface energy.

8. The filter module according to claim 1, wherein the components for collecting overspray comprise a wall on the frame.

9. The filter module according to claim 1, wherein the frame has an air inlet and an air outlet, and wherein an air conduit from the air inlet to the air outlet is formed by the frame and the components for collecting overspray.

10. The filter module according to claim 9, wherein the air conduit has an air channel which, when viewed in the direction of flow, is positioned between the air inlet and the plurality of filter elements, and wherein the air channel is funnel-shaped.

11. The filter module according to claim 1, wherein the frame is made of aluminum sections and the aluminum sections are clad with aluminum sheet.

12. The filter module according to claim 1, comprising a breaking device is configured to break adhesions of overspray on the filter module and to facilitate replacement of the plurality of filter elements.

13. The filter module according to claim 2, comprising, on an upper side of the base of the frame, a collection pan for collecting liquid.

14. The filter module according to claim 1, comprising a device having two recesses, the device having two recesses arranged on the underside of a base of the frame for insertion of forks of an industrial truck, and wherein the device is configured in as a Euro-pallet.

15. The filter module according to claim 8, wherein the wall is made of cardboard, paperboard, or paper.

16. The filter module according to claim 13, wherein the collection pan comprises an open flap for insertion of the plurality of filter elements.

* * * * *